(12) United States Patent
Wulff et al.

(10) Patent No.: US 8,520,860 B2
(45) Date of Patent: Aug. 27, 2013

(54) MODULAR MOBILE COMPUTING HEADSET

(75) Inventors: Thomas Wulff, North Patchogne, NY (US); Daniella Strat, Sound Beach, NY (US); Mark Wheeler, East Setauket, NY (US); Nicole D. Tricoukes, Seaford, NY (US); Mark Duron, East Patchogue, NY (US); David Bellows, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1252 days.

(21) Appl. No.: 11/955,733

(22) Filed: Dec. 13, 2007

(65) Prior Publication Data

US 2009/0154719 A1 Jun. 18, 2009

(51) Int. Cl.
*H04R 1/10* (2006.01)
(52) U.S. Cl.
USPC ............. 381/74; 381/122; 381/370; 381/375; 455/575.1; 455/575.2; 361/600
(58) Field of Classification Search
USPC .................. 381/375, 74, 600, 122, 370, 371, 381/372, 374, 376, 384; 361/600; 455/575.1, 455/575.2, 90.1, 90.2, 90.3, 149, 350
See application file for complete search history.

(56) References Cited

U.S. PATENT DOCUMENTS

| | | | |
|---|---|---|---|
| 6,230,029 B1 * | 5/2001 | Hahn et al. ................. | 455/575.2 |
| 6,430,299 B1 * | 8/2002 | Hall et al. .................... | 381/371 |
| 6,725,061 B1 * | 4/2004 | Hutchison et al. ........... | 455/557 |
| 2005/0134726 A1 * | 6/2005 | Parulski et al. ............. | 348/373 |
| 2006/0140435 A1 * | 6/2006 | Sheehy et al. ............... | 381/390 |
| 2007/0183616 A1 | 8/2007 | Wahl et al. | |
| 2007/0184881 A1 * | 8/2007 | Wahl et al. ................. | 455/575.2 |
| 2007/0242834 A1 * | 10/2007 | Coutinho et al. ........... | 381/71.8 |

FOREIGN PATENT DOCUMENTS

| | | |
|---|---|---|
| CA | 2402030 A | 12/2008 |
| CN | 1354958 A | 6/2002 |
| DE | 202007003341 U1 | 8/2007 |
| EP | 1519620 A2 | 3/2005 |
| JP | 2003219492 A | 7/2003 |
| WO | 2007126406 A1 | 11/2007 |
| WO | 2009076016 | 6/2009 |

OTHER PUBLICATIONS

International Preliminary Report on Patentability dated Jun. 24, 2010 in related case PCT/US2008/083949.
PCT/US2008083939—European Application No. 08859327.2—European Patent Office Search Report dated Dec. 11, 2010—5 pages.
International Search Report and Written Opinion for International Patent Application No. PCT/US2008/083949 mailed on Jan. 14, 2009.
English Language translation of Office Action mailed on Oct. 31, 2011 in Korean Patent Application No. 10-2010-7015510.
English Language translation of Office Action mailed on May 2, 2012 in Korean Patent Application No. 10-2010-7015510.
English Translation of Allowed Claims mailed Sep. 27, 2012 in Korean Patent Application No. 10-2010-7015510.
English translation of Office Action dated Dec. 26, 2012 in related China patent application No. 200880126195.7.

* cited by examiner

*Primary Examiner* — Vivian Chin
*Assistant Examiner* — Paul Kim

(57) ABSTRACT

A system comprises an accessory, a mobile unit module, and a battery pack module. The accessory is worn one of on and near a portion of a body of a user. The mobile unit module removably couples to the accessory. The battery pack module removably couples to one of the mobile unit and the accessory.

12 Claims, 8 Drawing Sheets

MODULAR MOBILE COMPUTING HEADSET

FIELD OF THE INVENTION

The present invention relates generally to a modular mobile computing headset. Specifically, the headset includes at least one module to increase a number of functionalities associated with the headset.

BACKGROUND

A mobile unit (MU) for data capture may include a variety of different components. For example, the MU may include a transceiver for a radio frequency identification (RFID) functionality. The MU may additionally include, for example, a wand scanner to receive/transmit an RFID signal from/to an object, to scan a barcode, etc. These multiple components require a user to use both hands to input and capture data. To free one of the user's hands, the MU may be mounted, for example, on the user's waist, arm, wrist, etc. However, the connecting wires for the components may get tangled, disconnect from ports, etc. Furthermore, depending on a location that the MU is worn, the components may be obtrusive and potentially limit a range of motion for the user. In addition, one hand of the user is still occupied with another component connected to the MU.

A headset may provide a user with voice and/or audio capabilities that is used hands-free. The headset is often connected to the MU with a connecting wire. The headset may also be a stand alone unit that is not connected to an accompanying MU. The headset may include circuitry embedded within the headset. However, for hygienic reasons, users do not wish to share headsets. Thus, the cost of the headset increases dramatically as a headset with all embedded circuitry is required for each user.

SUMMARY OF THE INVENTION

The present invention relates to a system comprising an accessory, a mobile unit module, and a battery pack module. The accessory is worn one of on and near a portion of a body of a user. The mobile unit module removably couples to the accessory. The battery pack module removably couples to one of the mobile unit and the accessory.

DETAILED DESCRIPTION

Figure 1:
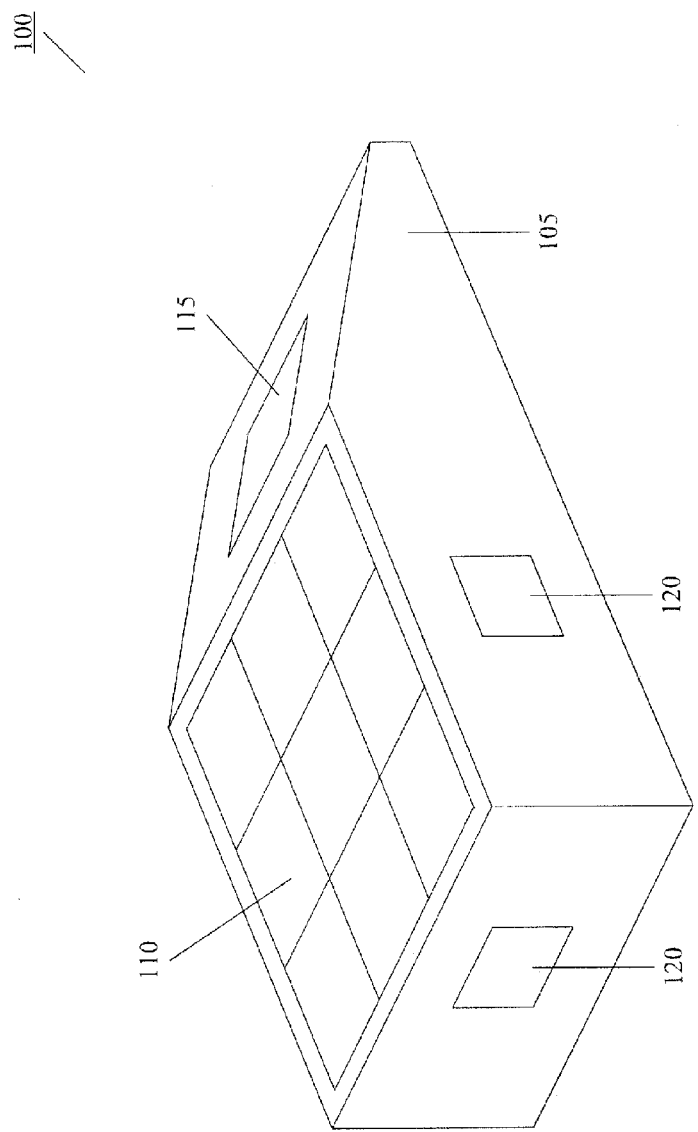
FIG. 1 shows a perspective view of an exemplary mobile unit according to an exemplary embodiment of the present invention.

The exemplary embodiments of the present invention may be further understood with reference to the following description and the appended drawings, wherein like elements are referred to with the same reference numerals. The exemplary embodiments of the present invention describe a modular mobile computing headset. Specifically, the headset of the exemplary embodiments of the present invention may removably attach modular components that include a mobile unit (MU) and a battery pack. The headset may be equipped with further components to provide additional functionalities such as a radio frequency identification (RFID) antenna. The headset, the MU, the battery pack, and the components thereof will be discussed in more detail below.

FIG. 1 shows a perspective view of an exemplary MU 100 according to an exemplary embodiment of the present invention. The MU 100 may be any portable electronic device that utilizes a portable power supply (e.g., battery, capacitor, super capacitor, etc.). The MU 100 and any components of the MU 100 may be sized to be relatively small and lightweight as the MU 100 may be attached to a headset. As will be discussed in detail below, a disposition of the portable power supply for the MU 100 may vary. The MU 100 may include a housing 105, a data input arrangement 110, a scanner window 115, and module attachment sites 120.

The housing 105 may provide a casing in which components of the MU 100 may be at least partially disposed. That is, the components of the MU 100 may be wholly or partially within the housing 105. For example, the data input arrangement 110 and the scanner window 115 may be disposed partially within the housing 105 so that a portion of these components are disposed on a periphery of the main housing 105. It should also be noted that other components of the MU 100 such as a processor, a memory, etc. may be disposed wholly within the main housing 105.

The data input arrangement 110 may be, for example, a key pad. The key pad may include alphacentric keys, numeric keys, or a combination thereof. It should be noted that the data input arrangement 110 being disposed wholly on a single side of the housing 105 is only exemplary. For example, the MU 100 may include a side data input arrangement such as a key pad disposed on another side of the housing 105. The MU 100 may further include a display (not shown) to visually show data relating to a functionality that the MU 100 is executing. The display may further be a touch pad to allow a user to manually enter data through contact of the display.

The scanner window 115 may provide a transparent, protective via in which a scanning engine disposed within the housing 105 may take scans. Those skilled in the art will understand that the scanning engine may require a line of sight to an object to be scanned. For example, the scanning engine may be a barcode (e.g., one-dimensional, two-dimensional) scanner. Thus, lasers from the scanning engine may be produced and emitted through the scanner window 115 to the object. In other examples, the scanning engine may be an imager, a camera, etc. Consequently, the scanner window 115 may be aligned with the scanning engine. It should be noted that the MU 100 including the scanner window 115 and the scanning engine is only exemplary. That is, the MU 100 may only include basic components such as the processor and the memory.

The module attachment sites 120 may provide a locking mechanism so that a user may further attach other modules to increase functionalities executed by the MU 100. The module attachment sites 120 may also include circuitry to electrically connect the other modules to the electronic components of the MU 100 (e.g., the processor). For example, because the MU 100 is designed to be small and lightweight, the MU 100 may only include basic components such as the processor and the memory. Therefore, the MU 100 may not have a transceiver that is incorporated within the housing 105. A module that includes a transceiver and an antenna may be attached at one of the module attachment sites 120. The MU 100 may then be equipped to execute an RFID functionality. It should be noted that the MU 100 not including the transceiver/antenna is only exemplary. It should also be noted that the MU 100 including two module attachment sites 120 is only exemplary. That is, the MU 100 may include module attachment sites 120 on any of the sides of the housing 105. The MU 100 may also include more than one module attachment site 120 on any one side of the housing 105.

Figure 2:
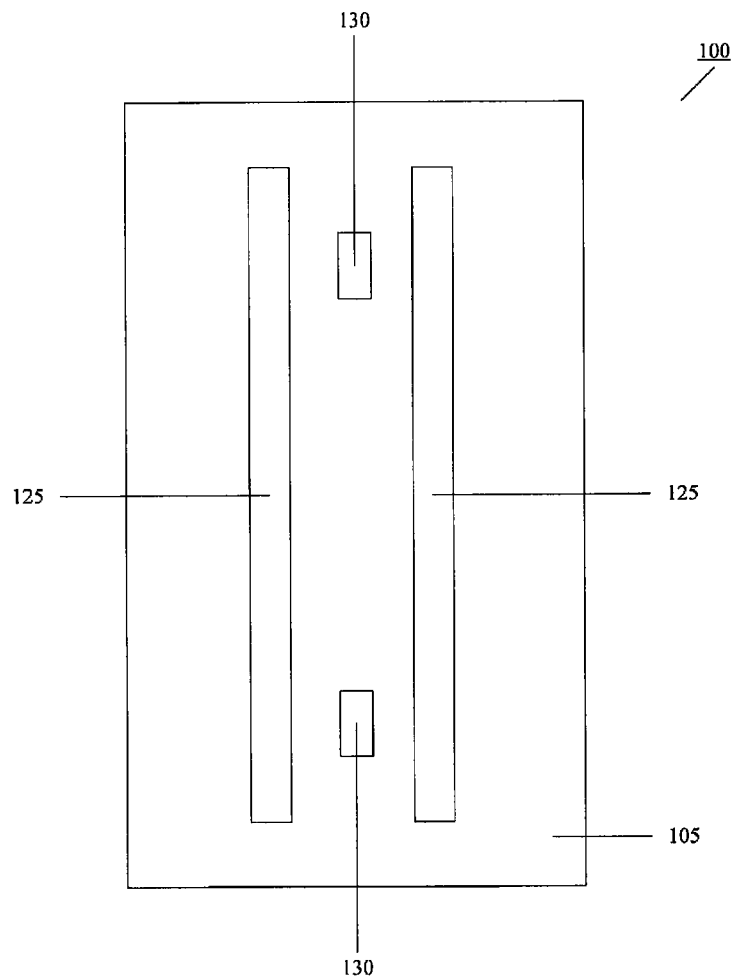
FIG. 2 shows a back view of the exemplary mobile unit of FIG. 1 according to an exemplary embodiment of the present invention.

FIG. 2 shows a back view of the exemplary MU 100 of FIG. 1 according to an exemplary embodiment of the present invention. The components illustrated on the back side of the MU 100 may allow the MU 100 to be attached to other components. For example, the MU 100 may be attached to a headset. The back view shows attachment channels 125 and power supply connectors 130.

The attachment channels 125 may be configured to couple to a complementary set of rails. According to the exemplary embodiments of the present invention and as will be discussed in further detail below, the complementary set of rails may be located on a headband of a headset. Furthermore, the headband of the headset may be the set of rails. The attachment channels 125 may extend from the back side of the housing 105. The attachment channels may have, for example, an L-shaped cross section. That is, the L-shape with the back side of the housing 105 may create the channel in which a rail is received. The attachment channels 125 may be contoured to a shape exhibited by the complementary set of rails. For example, if the complementary set of rails is the headband of the headset, the headband may have a substantially rounded shape. Thus, the attachment channels 125 may also have the substantially rounded shape so that a proper coupling may take place. The attachment channels 125 may also be equipped to allow the MU 100 to be moved relative to the component with the complementary set of rails after coupling. For example, the attachment channels 125 may be allow the MU 100 to slide across the complementary set of rails (depending on a length of the rails). It should also be noted that the use of the headset is only exemplary. The MU 100 may also be coupled to other devices such as mounts (e.g., a finger mount, a wrist mount, a belt mount, a pocket mount, a pendant mount, etc.). The attachment channels 125 may also be used for the mounts.

The power supply connectors 130 may be configured to couple to a battery pack. The power supply connectors 130 may function substantially similar to the module attachment sites 120. Specifically, the power supply connectors 130 may provide a locking mechanism so that a user may attach a battery pack. Furthermore, the power supply connectors 130 may include circuitry to draw power from the battery pack to supply to the components of the MU 100 (e.g., the processor). As discussed above, the MU 100 may be any electronic device that utilizes a portable power supply. In a first exemplary embodiment, because the MU 100 is sized to be relatively small and light weight, the MU 100 may not include an incorporated power supply. Thus, the battery pack may be coupled to the MU 100 through the power supply connectors 130. However, it should be noted that the MU 100 not including an incorporated portable power supply is only exemplary. For example, in a second exemplary embodiment, the MU 100 may include an incorporated portable power supply. A separate battery pack may be coupled to the MU 100 through the power supply connectors 130 to provide additional power such as when the incorporated portable power supply is used as a backup power source.

Figure 3A:
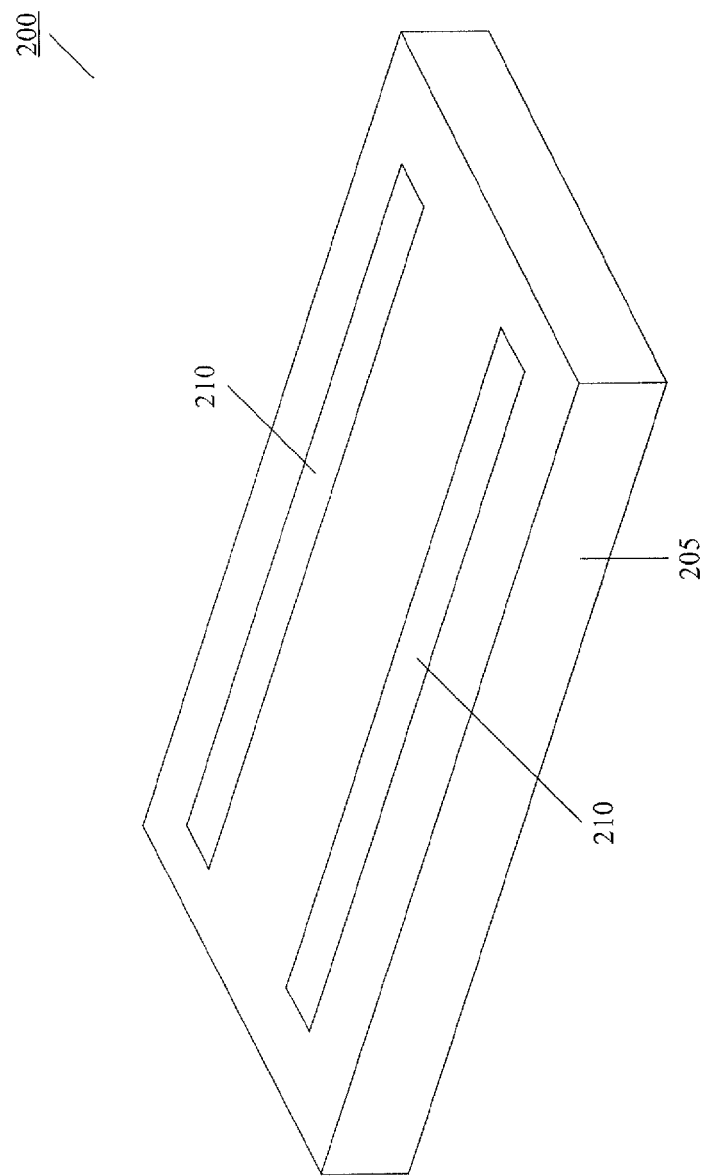
FIG. 3a shows a perspective view of a first side of an exemplary battery pack according to an exemplary embodiment of the present invention.

FIG. 3a shows a perspective view of a first side of an exemplary battery pack 200 according to an exemplary embodiment of the present invention. As discussed above, the battery pack 200 may be the portable power supply that provides the necessary energy for the MU 100 to function. As a battery, the battery pack 200 may include a plurality of cells that are charged and store the energy. The battery pack 200 may be rechargeable to allow the same battery pack 200 to be reused upon discharge of the energy. It should be noted that the use of a battery is only exemplary. Those skilled in the art will understand that the battery pack 200 may be used to represent any form of portable power supply such as a capacitor, a supercapacitor, or any combination thereof. The first side of the battery pack 200 may include a battery housing 205 and battery attachment channels 210.

The battery housing 205 may function substantially similar to the housing 105 of the MU 100. Specifically, the battery housing 205 may provide a casing in which components of the battery pack 200 may be at least partially disposed. For example, the plurality of cells may be disposed wholly within the battery housing 205. The battery housing 205 may be sized to correspond to the MU 100. That is, when the battery 200 is coupled to the MU 100, the housing 105 and the battery housing 205 may create a flush overall exterior.

The battery attachment channels 210 may function substantially similar to the attachment channels 125. Specifically, the battery attachment channels 210 may couple to a complementary set of rails. Thus, the battery attachment channels 210 may allow the battery pack 200 to be coupled to other devices that the MU 100 is capable of coupling to such as the headset and mounts.

It should be noted that the battery pack 200 being coupled to the MU 100 on a common side where the MU 100 includes the attachment channels 125 is only exemplary. For example, the battery pack 200 may couple to the MU 100 at the module attachment sites 120 or any other side of the MU 100. Thus, the power supply connectors 130 may be disposed on any surface of the housing 105 of the MU 100. Furthermore, the MU 100 may be equipped to attach to the other device via the attachment sites 120 so that the battery pack 200 may not be disposed between the MU 100 and the other device.

Figure 3B:
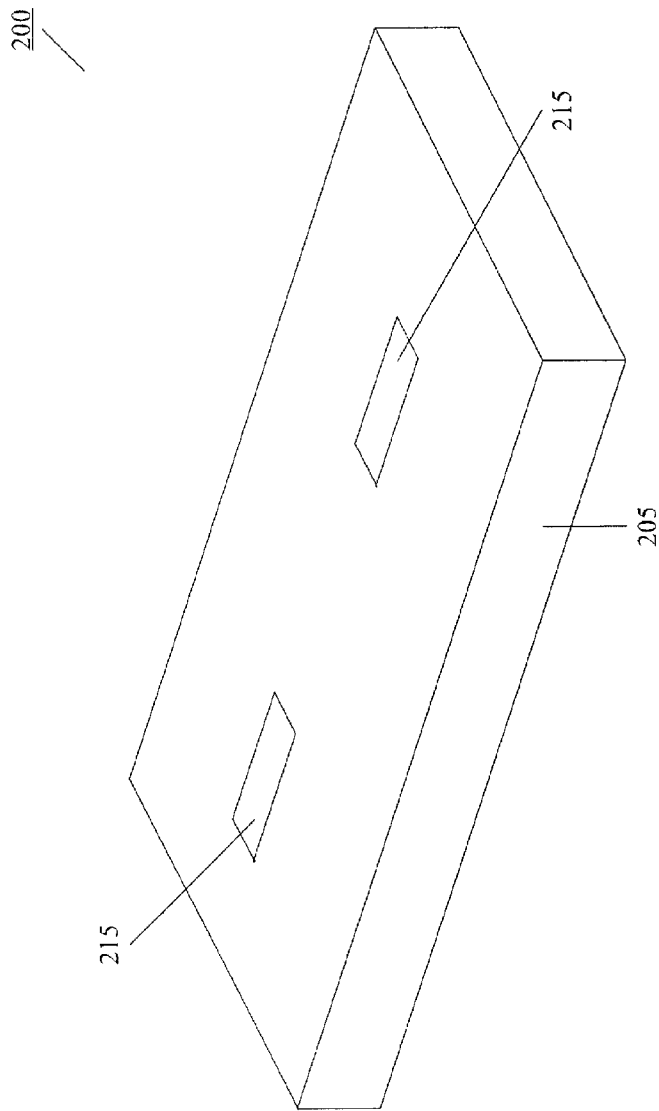
FIG. 3b shows a perspective view of a second side of the exemplary battery pack of FIG. 3a according to an exemplary embodiment of the present invention.

FIG. 3b shows a perspective view of a second side of the exemplary battery pack 200 of FIG. 3a according to an exemplary embodiment of the present invention. The second side of the battery pack 200 may be opposite to the first side shown in FIG. 1. The second side of the battery pack 200 may include the housing 205 and battery connectors 215.

The battery connectors 215 may couple to the power supply connectors 130 of the MU 100. As discussed above, the battery pack 200 may couple with the MU 100 to provide the necessary energy. The coupling of the battery connectors 215 to the power supply connectors 130 may establish an electrical connection to allow the MU 100 to draw energy from the stored energy of the cells housed in the battery housing 205.

The battery connectors 215 may be, for example, a set of pins, a plurality of flat contacts, etc.

As will be discussed in detail below, the disposition of the battery connectors 215 on the second side and the battery attachment channels 210 on the first side may provide a variety of embodiments for attachment of the MU 100, the battery 200, or the coupled MU 100 with the battery 200 on the headset. For example, in a first exemplary embodiment, the MU 100 and the battery 200 may be coupled and then attached to the headset. That is, the battery attachment channels 210 are located on an opposite side of the battery connectors 215 so that the MU 100 may couple thereto (as will be discussed with reference to FIGS. 5a-b). In a second exemplary embodiment, the MU 100 and the battery 200 may be attached to the headset at different locations. If the set of rails is long enough, the MU 100 and the battery 200 may be attached at different points along the same headband of the headset (as will be discussed with reference to FIG. 5c). In a third exemplary embodiment, the battery 200 may be a non-modular component of the MU 100. For example, the battery 200 may be an internal component of the MU 100.

It should also be noted that the use of the power supply connectors 130 and the battery connectors 215 is only exemplary. The battery pack 200 and the MU 100 may also be coupled using the attachment channels 125 and the battery attachment channels 210, respectively. That is, the attachment channels 125 and the battery attachment channels 210 may be configured to attach to corresponding rails but may also be configured to attach to each other. The coupling of the attachment channels 125 to the battery attachment channels 210 may provide an electrical connection between the battery pack 200 and the MU 100. It should be noted that the MU 100 and/or the battery pack 200 may be equipped with additional attachment channels 125 and battery attachment channels 210, respectively.

Figure 4:
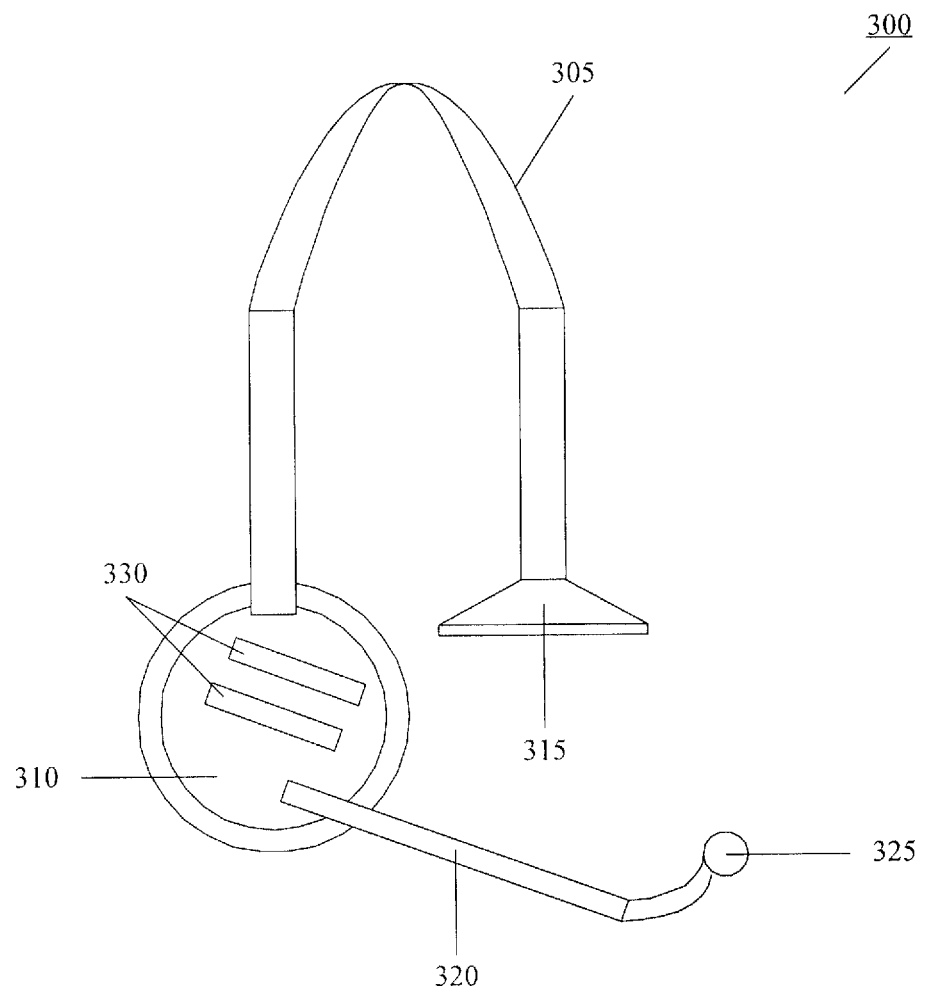
FIG. 4 shows a perspective view of an exemplary headset according to an exemplary embodiment of the present invention.

FIG. 4 shows a perspective view of an exemplary headset 300 according to an exemplary embodiment of the present invention. As discussed above, the headset 300 may be a device in which the MU 100, the battery pack 200, or a coupled MU 100 with battery pack 200 may be attached. The headset 300 may provide voice functionalities so that a user may receive sounds and input sounds, in particular voice communications. The headset 300 may include a headband 305, an audio output 310, a stabilizer 315, a boom 320, an audio input 325, and rails 330.

The headband 305 may be a supporting mechanism to allow the headset 300 to be used hands-free. The headband 305 may rest on a top surface of a user's head. The headband 305 may be partially elastic so that the headband 305 may flex to conform to the top surface of the user's head. The headband 305 may be manufactured, for example, of a semi-elastic polymer with a spring metal interior. The stabilizer 315 may be a padding disposed at a first end of the headband 305. The padding may provide a comfortable end to the headband 305. Because the ends of the headband 305 partially squeeze (e.g., to securely hold the head set 300 on the user's head), the stabilizer 315 may allow the comfortable use of the headset 300. It should be noted that the headband 305 exhibiting a substantially parabolic shape is only exemplary. The headband 305 may have any shape so that a user may comfortably wear the headset 300 and also attach any modules thereto. For example, the headband 305 may include square corners so that two legs attach to ends of a third leg and extend in common directions. An inner side of the squared cornered headband may be arched to conform to the user's head. In another example, the headband 305 may include an additional arch extending from a midpoint of the headband 305 toward a user's neck. This additional arch may further provide a stabilizing effect when the headset 300 is worn. Furthermore, it should be noted that an insulating layer may be disposed along an inner layer of the headband 305.

The rails 330 may be disposed on an outer periphery of the audio output 310. The rails 330 may be the complementary set of rails in which the attachment channels 125 of the MU 100 and/or the battery attachment channels 210 of the battery pack 200 couple. The rails 330 may be slightly extended. The rails 330 may exhibit a substantial L-shape so that a substantial channel may be created with the outer periphery of the audio output 310. Thus, the attachment channels 125 or the battery attachment channels 210 may slide, clip, etc. onto the rails 330. The rails 330 and/or the attachment channels 125/battery attachment channels 210 may be equipped with a locking mechanism to ensure that the coupling holds firmly. For example, the locking mechanism may be a latch. In another example, the locking mechanism may be from a squeezing pressure exerted by the attachment channels 125/battery attachment channels 210 on the rails 330. In yet another example, the locking mechanism may consist of a small recess disposed on the rails 330 in which an extension disposed on the attachment channels 125/battery attachment channels 210 is received.

According to the exemplary embodiments of the present invention, the headband 305 may also be used as the above described complementary set of rails to which the attachment channels 125 of the MU 100 and/or the battery attachment channels 210 of the battery pack 200 couple. That is, in a first exemplary embodiment, the headband 305 may be an elongated form of the rails 330 that extends from the first end to the second end of the headband 305. In another exemplary embodiment, the headband 305 may include a portion that substantially resembles the rails 330 (e.g., only extends on a top most portion of the headband 305). In yet another exemplary embodiment, the headband 305 may include several portions disposed along the headband 305 that substantially resembles the rails 330. Thus, the MU 100 or the battery pack 200 may be attached to the headset 300 in any of these locations. The headband 305 may also exhibit a cross section that has a substantial H-shape. The H-shape may allow the attachment channels 125 and/or the battery attachment channels 210 to be received into the recesses of the H-shape. Furthermore, the cross section being a substantial H-shape of the headband 305 may allow the modules (e.g., the MU 100, the battery 200, etc.) to slide along the length of the headband 305 that exhibits the H-shape.

The rails 330 and/or the headband 305 may be configured to include electrical contact points. For example, the rails 330 may include a conducting surface along an inner side of the L-shape. The conducting surface may serve as the electrical contact point. In another example, the headband 305 may be lined with a conducting surface, preferably along an area that does not contact the user's head such as on an inner lining along the recesses of the H-shape. The attachment channels 125 and the battery attachment channels 210 may also be configured to include corresponding electrical contact points that couple to the electrical contact points of the rails 330 and/or the headband 305. Thus, power from the battery pack 200 may be drawn by any component that is electrically connected amongst each other.

The rails 330 and/or the headband 305 may further be configured to include data contact points. The data contact points may be substantially similar to the electrical contact points discussed above. The data contact points may be used to exchange data signals between any module attached to the headset 300 to the different components of the headset 300. It should be noted that the use of a separate set of data contact points is only exemplary. For example, the electrical contact points may be configured to utilize data over direct current (DC) methods. The contact points may also be used for RF conductivity between the MU 100 and the headset 300.

The audio output 310 may be, for example, a speaker. The audio output 310 may be disposed at a second end of the headband 305. The audio output 310 may include a cushion substantially similar to the cushion for the stabilizer 315. Again, because the ends of the headband 305 partially squeeze, the cushion of the audio output 310 may provide the comfortable wearing of the headset 300. When the headset 300 is placed in a proper orientation on the user's head, the audio output 310 may be disposed around a user's ear. Furthermore, the stabilizer 315 may be disposed slightly above a user's other ear. The audio output 310 may be sized so that a circuitry for the headset 300 may be disposed therein. The audio output 310 may also be configured in an offset geometry such as "open" (i.e., not contacting the ear or head) or in a closed geometry such as "closed" (i.e., cupped and sealed around the ear).

The boom 320 may be a flexible extension that includes wiring. A first end of the boom 320 may be attached to the second end of the headband 305. In a specific embodiment, the first end of the boom 320 may be attached on the audio output 310. A second end of the boom 320 may be attached to the audio input 325. The wiring within the boom 320 may electrically connect the audio input 325 to the circuitry of the headset 300. The audio input 325 may be, for example, a microphone. The flexibility of the boom 320 may allow a user to orient the headset 300 so that the audio input 325 is disposed near a user's mouth. The audio input 325 may include a foam coat so that sounds received by the audio input 325 may be filtered. The audio input 325, the electrical component responsible for the audio input 325, and/or the MU 100 may include active noise cancellation techniques to provide a highest quality of voice to a user, in particular to users in noisy industrial environments.

In an exemplary embodiment of the present invention, the boom 320 may also include an antenna. The antenna may be used for telecommunications functionalities. The antenna may also be used for data capturing functionalities such as RFID. The antenna may be sized to incorporate the various functionalities associated therewith. For example, the boom 320 and, subsequently, the antenna disposed therein may be approximately six inches corresponding to half a wavelength for a frequency in which the RFID functionality operates.

The antenna being disposed within the boom 320 offers advantages over conventional antennas for RFID functionalities. For example, the boom 320 extends from the headset 300 outward, away from the user's head. Thus, the antenna is also extended away from the user's head to prevent any blockage of a radiated pattern generated by the antenna from the user's head. In another example, the boom 320 may be flexible and adjustable. The boom 320 may allow for a pivotal movement with respect to an attached point on the audio output 310. The boom 320 may also allow for a random movement along any point of the boom 320. Consequently, the antenna may also be adjusted through the boom so that a direction and shape of the radiated pattern from the antenna becomes adjustable. In yet another example, the boom 320 may be equipped with a switch disposed, for example, at the pivotal joint located on the audio output 310. Thus, when the RFID functionality is idle or not being used (e.g., only the voice communication functionalities are being used on the headset 300), the boom 320 may be moved into an upright position. The antenna in the boom may couple to the metal inside the headband 305, thereby shifting the tuned frequency of the antenna that effectively deactivates the antenna. This may trigger the RFID radio to automatically deactivate or enter a sleep mode. Thus, several benefits such as saving power, addressing existing or conceived specific absorption rate (SAR) issues, etc. may be realized. The RFID transceiver or radio may ping the antenna at regular intervals and wake the system up when the boom 320 is in a "ready to use" position such as that illustrated in FIG. 4.

Figure 5A:
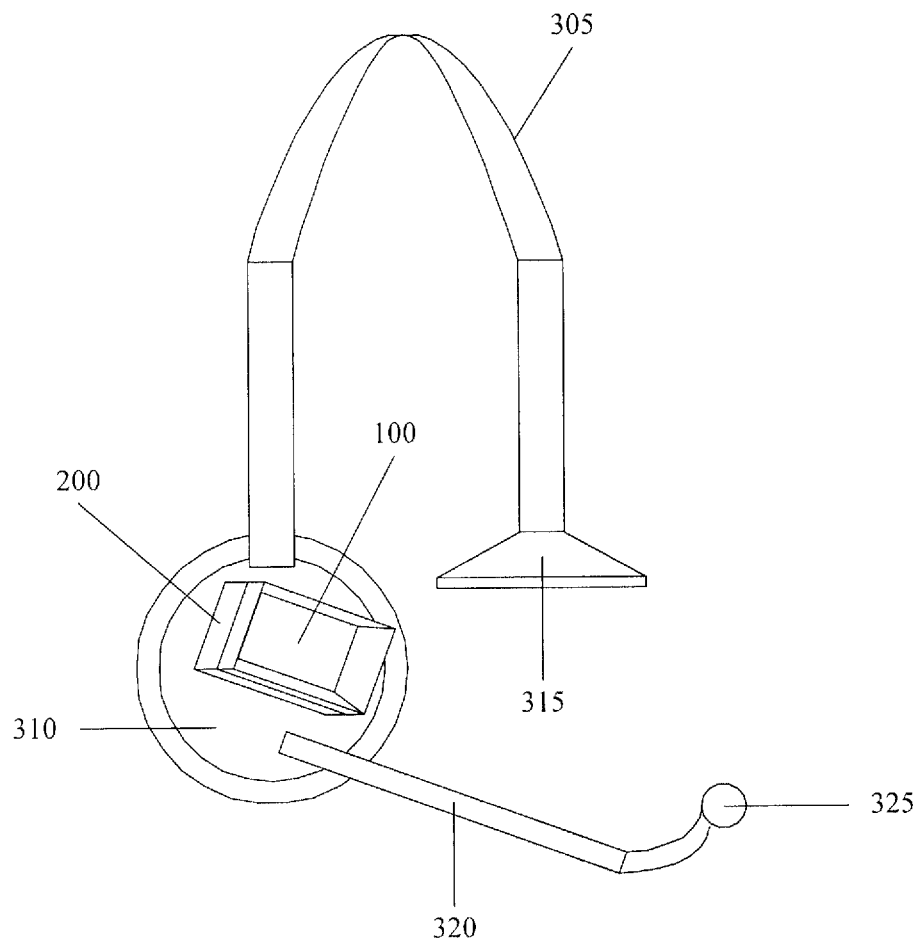
FIG. 5a shows a first assembled view of the mobile unit of FIG. 1, the battery pack of FIG. 3, and the headset of FIG. 4 according to an exemplary embodiment of the present invention.

FIG. 5a shows a first assembled view of the MU 100 of FIG. 1, the battery pack 200 of FIG. 3, and the headset 300 of FIG. 4 according to an exemplary embodiment of the present invention. As discussed above, the MU 100 and the battery pack 200 may be attached to the headset 300 in a variety of configurations. In the first assembled view, the MU 100 has been coupled to the battery pack 200. As discussed above, when the MU 100 is coupled to the battery pack 200, the power supply connectors 130 couple to the battery connectors 215. The assembled unit including the MU 100 and the battery pack 200 may subsequently attach to the headset 300 through the battery attachment channels 210. The first assembled view shows the assembled unit attaching to the headset 300 through the rails 330 disposed on the audio output 310. As discussed above, the rails 330 may include electrical contact points so that the assembled unit may electrically couple to the headset 300. Thus, the components of the headset 300 may be powered by the battery pack 200. For example, the audio output 310 may receive energy from the battery pack 200. The rails 330 may also include data contact points so that the assembled unit may exchange data signals with the components of the headset 300. For example, the audio output 310 may receive voice communication data from another device and play the data on the audio output 310.

Figure 5B:
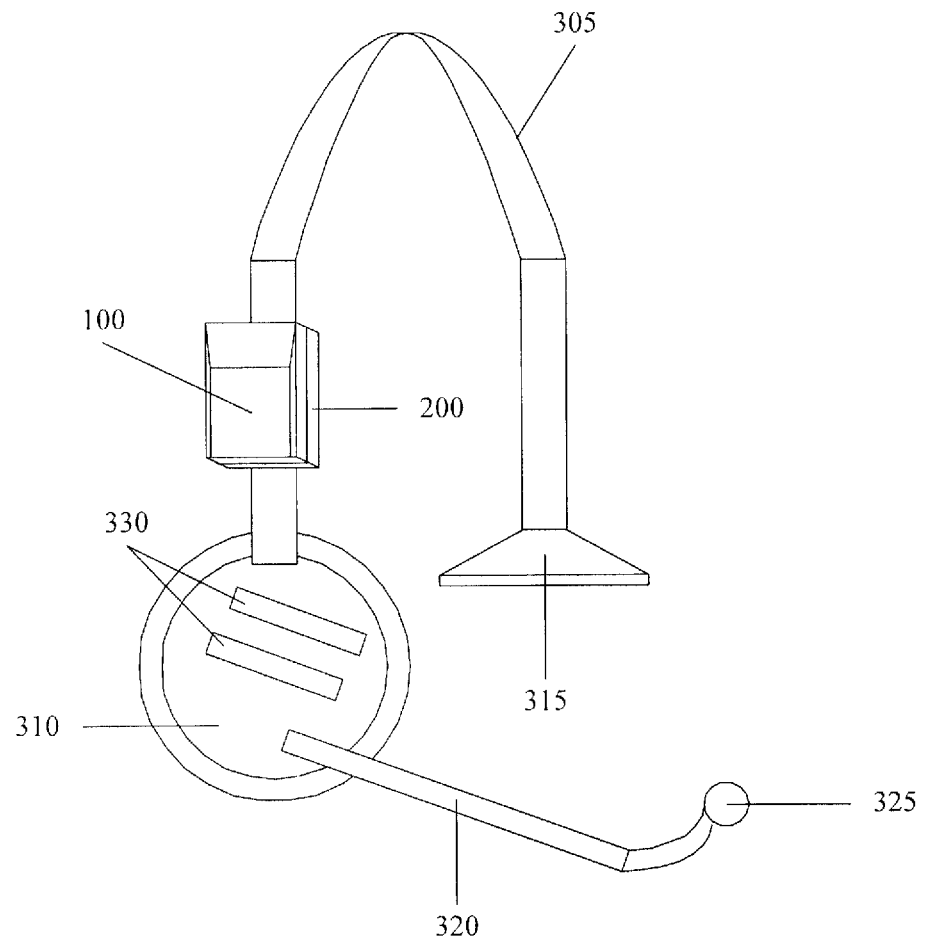
FIG. 5b shows a second assembled view of the mobile unit of FIG. 1, the battery pack of FIG. 3, and the headset of FIG. 4 according to an exemplary embodiment of the present invention.

FIG. 5b shows a second assembled view of the MU 100 of FIG. 1, the battery pack 200 of FIG. 3, and the headset 300 of FIG. 4 according to an exemplary embodiment of the present invention. The second assembled view shows another configuration in which the MU 100 and the battery pack 200 attaches to the headset 300. In the second assembled view, the MU 100 has also been coupled to the battery pack 200. Thus, the assembled unit is attached to the headset 300 through the battery attachment channels 210. The second assembled view shows the assembled unit attaching to the headset 300 through the headband 305. As discussed above, the headband 305 may include electrical contact points so that the assembled unit may electrically couple to the headset 300. Thus, the components of the headset 300 may be powered by the battery pack 200. The headband 305 may also include data contact points so that the assembled unit may exchange data signals with the components of the headset 300. Furthermore, the assembled unit may move along the headband 305 when the headband 305 is configured to exhibit the features of the complementary set of rails to the attachment channels 125/battery attachment channels 210. As discussed above, the headband 305 may include an additional side that may, for example, extend from a midpoint of the parabola toward a neck of a user. The assembled unit may also be attached to the headset 300 at this location.

Figure 5C:
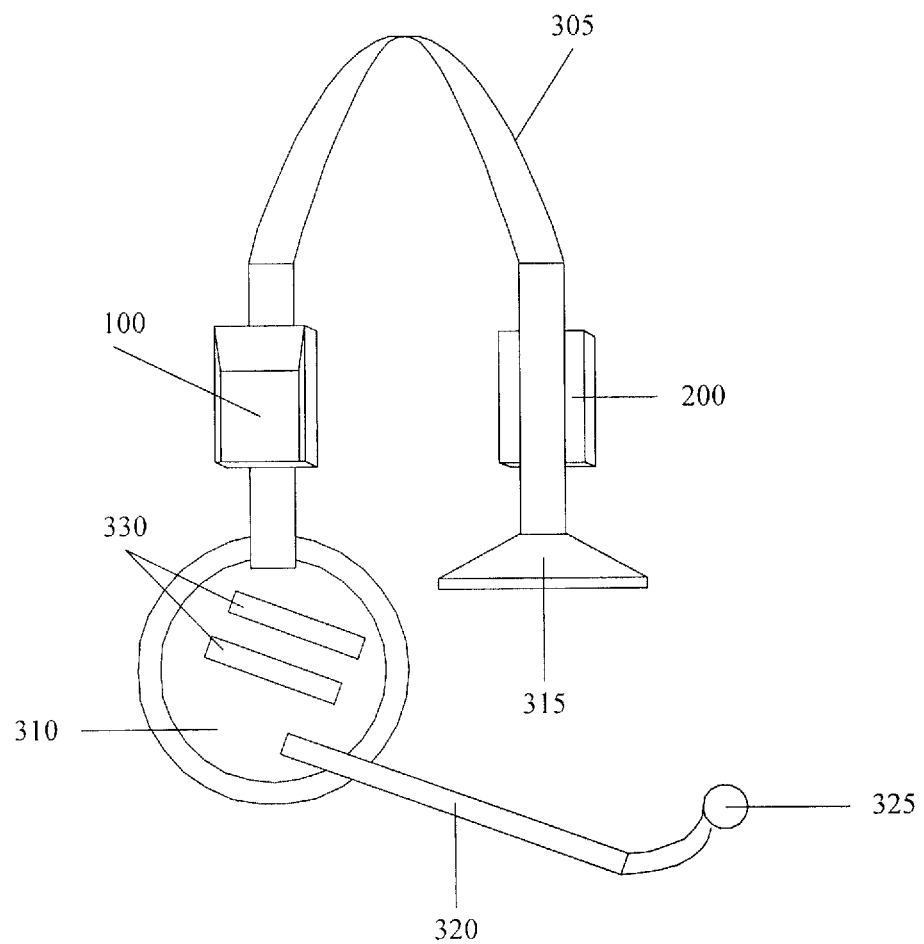
FIG. 5c shows a third assembled view of the mobile unit of FIG. 1, the battery pack of FIG. 3, and the headset of FIG. 4 according to an exemplary embodiment of the present invention.

FIG. 5c shows a third assembled view of the MU 100 of FIG. 1, the battery pack 200 of FIG. 3, and the headset 300 of FIG. 4 according to an exemplary embodiment of the present invention. The third assembled view shows yet another configuration in which the MU 100 and the battery pack 200 separately attach to the headset 300. In the third assembled view, the MU 100 remains separated from the battery pack 200. Thus, each module (i.e., the MU 100 and the battery pack 200) is attached to the headset 300. The MU 100 attaches to the headset through the attachment channels 125 while the battery pack 200 attaches to the headset through the battery attachment channels 210. The third assembled view shows the MU 100 and the battery pack 200 attaching to the headset 300 through the headband 305. However, in the third assembled view, the MU 100 and the battery pack 200 are attached on different areas of the headband 305. Specifically, the battery pack 200 is disposed closer to the second end of the headband 305 (i.e., toward the stabilizer 315) while the MU 100 is disposed closer to the first end of the headband 305 (i.e., toward the audio output 310). This configuration illustrated in the third assembled view may be used to, for example, stabilize the headset 300 on the user's head. That is, the assembled unit of the MU 100 and the battery pack 200 may increase a weight disposed on one side of the headset 300. This may cause discomfort. Thus, spreading out the weight along the headset may provide a more comfortable disposition on the user's head. The electrical connections established through the third assembled view allows energy and data signals to be transmitted to any of the components of the assembly. The third assembled view may also represent any embodiment in which the MU 100 and the battery pack 200 are not coupled when attaching to the headset 300. For example, the MU 100 may attach to the headset 300 via the rails 330 while the battery pack 200 may attach to the headset 300 via the headband 305 or vice versa.

According to the exemplary embodiments of the present invention, the MU 100 may be a smart carrier. That is, the MU 100 may recognize when the MU 100 is attached to the headset 300. The MU 100 may further recognize when the MU 100 is attached to other devices such as a mount. Thus, an automatic settings adjustment may be made to modify functionalities according to the device in which the MU 100 is attached. This automatic settings adjustment may be transparent to a user so that the user may not be required to perform any of the settings adjustment related to attachment to the headset 300, the mount, etc.

The MU 100 may be configured as a thin client or a thick client configuration. The thick client configuration may enable the MU 100 to have full processing and memory capability built therein to enable full voice functionalities. For example, a voice recognition protocol may be installed on the MU 100 so that a specific user may activate the MU 100 and/or the headset 300. In addition, this independent functionality may be accomplished whether the MU 100 is connected to a network or infrastructure. That is, the MU 100 is not required to be within an operating area of the network to function. The thin client configuration may have reduced functionalities such as a reduced processing power and memory. If a voice recognition protocol is only available through a network or infrastructure, the MU 100 may be required to be connected thereto in order to utilize the functionalities of the MU 100 and/or the headset 300. It should be noted that the headset 300 may also be configured with the thin client or the thick client configuration.

According to the exemplary embodiments of the present invention, the headset 300 and/or the MU 100 may be equipped with data capturing devices such as an RFID reader. For example, as discussed above, the headset 300 may include an RFID antenna disposed within the boom 320. In a first exemplary embodiment, the triggering of the data capture devices may be done through a conventional trigger such as a button disposed on either the headset 300, the MU 100, or both. In another exemplary embodiment, the triggering of the data capture devices may be done through voice commands. That is, a user may activate the data capture devices through inputs received by the audio input 325. For example, for an RFID reader, a laser scanner, an imager, etc., a user may say "tag," "scan," etc. to execute a corresponding function. Furthermore, the data capture device such as the laser scanner or imager may include an aiming functionality. For example, the user may say "aim" causing a laser dot to appear for alignment purposes. Subsequently, a voice command of "scan" may be used to properly scan an item.

Because the exemplary embodiments of the present invention may be used for data capture functionalities, the data capture device may include an aiming functionality such as a laser pointer. However, the aiming functionality is only exemplary. For aiming of the data capture device, the data capture device may be disposed at the pivot point of the boom 320 and the audio output 310. The boom 320 itself may be used as a directional pointer so that a proper orientation may be had to capture the data. Furthermore, with the laser pointer, the laser may be directed along a same direction as the boom 320, thereby providing an ergonomic and stable data capture. The data capture device may be of an annular geometry and located anywhere along the headband 305, thereby enabling, for example, the user to adjust the data capture device aiming pattern up or down, etc.

Furthermore, according to the exemplary embodiments of the present invention, the MU 100 may be equipped with communications components such as a transceiver. The transceiver may provide a connectivity of the MU 100 to a wireless network using a variety of connectivity options (e.g., 802.11b/g/a/n, Bluetooth, WAN, WiMax, etc.). The headset 300 and/or the MU 100 may further be equipped with positioning components (e.g., global positioning system (GPS)). It should be noted that the communications component such as the transceiver may be a module that connects to the MU 100. That is, the MU 100 may not incorporate the communications component but may be equipped to execute the communications functionalities when the communications module is connected via the module attachment site 120.

In addition, the headset 300 and/or the MU 100 may be equipped with user profile/configurations. In a first exemplary embodiment, the user profile/configurations may be stored on the headset 300 and/or the MU 100. In a second exemplary embodiment, a network database of the wireless network may include the user profile/configurations so that when a user logs into the network, the user profile/configurations may automatically be set on the headset 300 and/or the MU 100. For example, music files may be stored locally on the headset 300 or downloaded from the network/infrastructure upon logging into the network. In another example, personalized voice commands for data capture or other functionalities may be set on the headset 300.

The exemplary embodiments of the present invention provide a modular system that creates a hands-free mobile computing headset to eliminate many components that are required with conventional hands-free mobile computing headsets. Furthermore, the exemplary embodiments of the present invention provide data capturing functionalities such as RFID. The module mobile headset of the exemplary embodiments of the present invention may allow for better inventory processing and workforce automation. For example, improvements may be made to receiving, put away, inventory control, picking, value-added processing, staging, and shipping.

The modularity of the exemplary embodiments of the present invention further eliminates any connectivity devices that may be necessary with conventional headset systems. That is, peripheral devices and/or cables are not necessary for the exemplary embodiments of the present invention. The headset 300 may include a mobile computing platform (e.g., thick client configuration). The modularity also addresses a hygiene cost issue through the MU 100 and the battery pack 200 being embodied as separate modules that are removably attached to the headset 300. Thus, the headset 300 may be a low cost accessory/cradle for the MU 100. Personalized headsets may still be accomplished with the modular MU 100 being personalized with a generic headset 300.

The MU 100 may be equipped with further modular attachments (via the module attachment sites 120) to further provide a variety of configurations for functionalities using a common headset accessory. For example, less functionalities may be preferred by a user. If a user does not require laser bar code scanning capabilities, a smaller electronic module that does not include this functionality (i.e., MU 100) may be purchased. A user may also not require RFID functionalities. Thus, a lower cost MU 100 may be used. In another example, additional functionalities may be preferred by the user. As discussed above, the MU 100 may be sized so that a display may not be incorporated. A display module may subsequently be attached to the MU 100 (via the module attachment site 120). The modularity of the MU 100 may also allow the MU 100 to become a handheld terminal with a display for use separately from the headset 300. The modularity of the components provides a highly customizable system to be used as needed by the user. Thus, the user may choose a configuration that suits financial, functional, and/or ergonomic needs.

As discussed above, the modularity of the MU 100 enables it to be attached to other devices. For example, the MU 100 may be attached to a mount such as a finger mount, a wrist mount, a belt mount, a pocket mound, a pendant mount, etc. Furthermore, the MU 100 may be coupled with the battery pack 200 and subsequently be received by various charging devices such as single or multi-slot cradles, cables, vehicle chargers, etc. It should be noted that the battery pack 200 itself may be received by the various charging devices. The battery pack 200 may be recharged using either the battery attachment channels 210 or the battery connectors 215. In addition, the modules that attach to the MU 100 (via the module attachment sites 120) may also be equipped with their own module attachment sites to further increase the potential configurations.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A headset, comprising:
   a headband configured to removably couple to a communication unit module including a processor, and a wireless transceiver module, such removable coupling using module attachment sites with electrical connections therebetween to allow data signals to be transmitted between the modules coupled to the headset to provide wireless communication, wherein the communication unit module can determine when it is coupled to the headband and automatically reconfigures itself when it determines it is coupled to the headband;
   a speaker disposed at a first end of the headband,
   a boom where a first end of the boom is pivotally attached to the first end of the headband; and
   a microphone disposed at a second end of the boom.

2. The headset of claim 1, wherein the boom further includes an antenna disposed therein, wherein the antenna is sized to correspond to a Radio Frequency Identification operating frequency.

3. The headset of claim 2, wherein the boom is made of a flexible material such that a direction and shape of a radiated pattern from the antenna becomes adjustable.

4. The headset of claim 1, wherein the boom includes a switch, where raising and lowering the boom actuates the switch to automatically deactivate or activate a radio communication capability of the communication unit module and transceiver module coupled to the headset.

5. The headset of claim 2, wherein the antenna in the boom couples to metal in the headband, wherein raising and lowering a position of the boom shifts a tuned frequency of the antenna to effectively deactivate or activate the antenna to automatically deactivate or activate a radio communication capability of the communication unit module and transceiver module coupled to the headset.

6. The headset of claim 5, wherein the transceiver module can send a periodic signal to the antenna to detect when the antenna is in an activated position in order to wake up the radio communication system.

7. The headset of claim 4, wherein when the radio communication capability is deactivated by a position of the boom, the radio communication system enters a sleep mode.

8. The headset of claim 5, wherein when the radio communication capability is deactivated by a position of the antenna, the radio communication system enters a sleep mode.

9. The headset of claim 1, wherein the communication unit module includes a portable power supply that, when couple along with a battery pack coupled on the headset provides additional power.

10. The headset of claim 1, wherein the communication unit module includes a scanning engine, and the headset is further comprising a laser pointer disposed at a pivot point of the boom and the speaker, wherein the laser pointer provides a directional pointer so that a proper orientation for scanning by the scanning engine.

11. The headset of claim 10, wherein the scanning engine is operable via voice commands through the headset.

12. The headset of claim 10, wherein the laser pointer is operable via voice commands through the headset.

* * * * *